Jan. 19, 1971 R. SCHOBER 3,556,738

EXOTHERMIC CATALYTIC GAS REACTOR

Filed July 24, 1967

INVENTOR
ROBERT SCHOBER

BY *Wenderoth, Lind & Ponack*

ATTORNEYS 3,556,738
                  EXOTHERMIC CATALYTIC GAS REACTOR
             Robert Schober, Carl Boschweg 8, Linz, Austria
                    Filed July 24, 1967, Ser. No. 655,585
                             Int. Cl. B01j 9/00
U.S. Cl. 23—289                                              7 Claims

ABSTRACT OF THE DISCLOSURE

In a cylindrical high pressure reactor, for instance for ammonia synthesis, a system of concentric fresh gas cooling tubes arranged with a surface decreasing towards the bottom, which extends through the entire catalyzer space in an axial plane according to height and breadth. Baffle plates are arranged horizontally in the catalyzer column with alternating peripheral recesses to guide the stream of reaction gas in a variable horizontal direction transversely through the cooling tube system.

---

Austrian Pat. 254,224 is a device for carrying out exothermic catalytic gas reactions, more especially of the synthesis of ammonia, with reactor-interior temperature regulation by means of gradual indirect cooling of the hot reaction gas after the discharge of the same from individual or from two or more catalyst layers protected by a fresh synthesis gas mixture characterized in that a fresh stream of synthesis gas which has been utilized previously in the known way for the cooling of the pressure casing of the reactor and thereupon has been preheated in a main heat exchanged flows through one or two groups of cooling tubes which extend continuously to above the initial catalyst layer, but said tubes being arranged diametrically on opposite sides of the interior of the reactor, whereupon the gas passes as hot reaction gas through a catalyzer column being divided with horizontal baffle plates with the alternating segmentally recessed gas passages, and in this way flows around only one side or both sides alternately of the sections corresponding to the turning points of the shortened baffle plates of the above mentioned cooling tube groups, if necessary being arranged on both sides of the catalyzer column, in counter current to the fresh gas, and finally passes through the tubes of the main heat exchanger to the reaction gas outlet.

It has now been found that the highest temperature on the catalyzer along the passage of the gas can be regulated by the same at least equally and that simultaneously a far-reaching constructive simplification because of an easier installation and removal of the furnace inset and besides that an enlargement of the volume of the catalyzer can be obtained, if one comprises the cooling tube system to one constructive unit and places the same in the center of the catalyzer column, where it forms a permeable wall for the reaction gas along the diameter of the guide tube.

An object of the invention is to maintain the essential elements of the mode of application and construction of the subject matter of Austrian Pat. 254,224, namely the guiding of the gas in alternating tranverse current effected by baffle plates through a homogenous catalyzer column, whereby the gradual cooling of the synthesis gas is accomplished during its respective change of flow along the cooling tubes extending approximately through the entire length of the catalyzer column.

A further object of the present invention is to provide a device for carrying out exothermic catalytic gas reactions, especially of the ammonia synthesis from nitrogen and hydrogen with preferably internal reactor temperature regulation by means of gradual, indirect cooling of the hot reaction gases during the change from one catalyzer layer to a consecutive one by fresh synthesis gas mixture characterized by the central arrangement of a continuous cooling tube system extending neraly over the entire height of the catalyzer filling of the furnace inset, being primarily flown through by the preheated fresh gas, with a permeable wall for the reaction gas in transverse flow along the entire diameter of the guide tube and baffle plates with alternating gas inlets in the walls for the formation of a transverse gas stream through the cooling tube system changing according to the degree of cooling.

With the above and other objects in view which will become apparent from the detailed description below, a preferred form of the invention is shown in the drawings in which.

Figure 1:
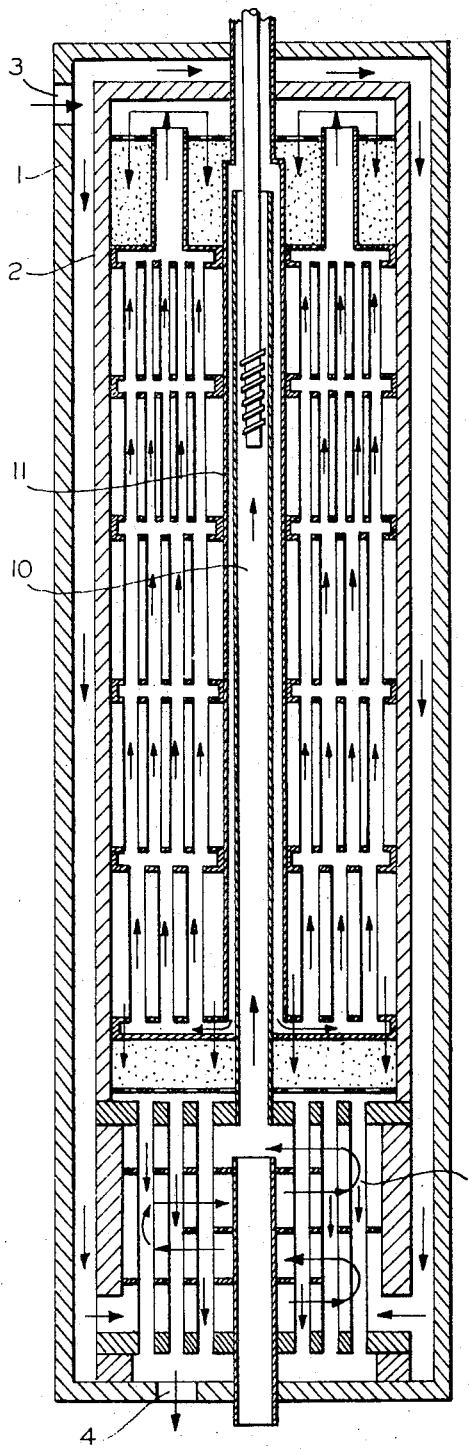
FIG. 1 is a schematic longitudinal cross-sectional view through the cooling tube system taken on section line 1—1 of FIG. 3.

In the drawings, 1 indicates the furnace casing or pressure body and 2 the guide tube or the inset casing. The casing has a gas inlet 3 and a gas outlet 4 and 5 is the catalyzer column. The baffle plates are shown at 6 and 7 are the cooling tubes of the system within the catalyzer, 8 are the apertured sheets or slot sheets or grids for the separation of the cooling tube system from the catalyzer fill. The main heat exchanger is shown at 9 and 10 is a central gas feeding line into which the burner extends from the top and 11 is a coaxial exterior gas return pipe. 12 are collector boxes arranged within the height of the baffle plates 6 which according to the illustration in FIG. 2 have the purpose to receive from both sides a different number of cooling tubes 7, when a decreasing or increasing or a change in the diameter or wall thickness of such cooling tubes in different heights of the catalyzer column is necessitated. The cooling tubes 7 may be also arranged in an unchanged number and strength, also without any interpositioned distribution boxes 12 through the entire catalyzer column.

In a sufficient tightness of the packing of the cooling tubes 7 or by the use of a catalyzer of a certain minimum grain size the separating grids 8 may be eliminated.

The described cooling tube system now either be installed as a constructive unit with the baffle plates in one part, into the guide tube, whereby the filling of the same with the catalyzer has to be coordinated gradually with the insertion, or one proceeds on top of each other in stories corresponding to the progression of the filling.

In FIG. 1 the possibility of the feed of cold gas to the primary gas being preheated in the main heat exchanger 9 is illustrated.

Figure 2:
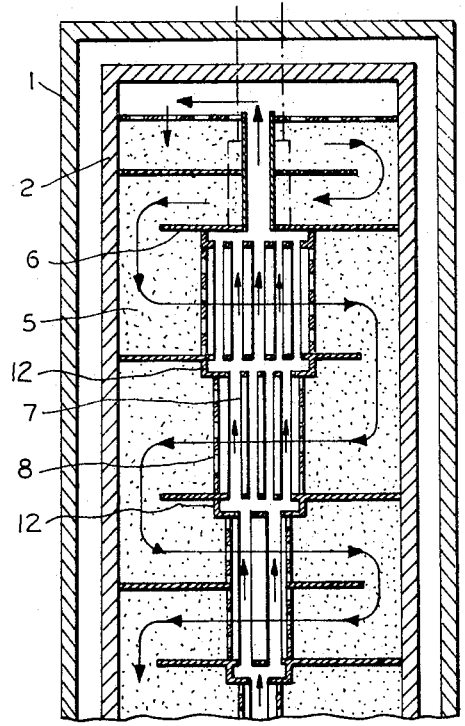
FIG. 2 shows a partial cross-sectional view taken on section line 2—2 of FIG. 3.

FIG. 2 illustrates how according to the present case the requirement can be met for an increased cooling of the first from becoming especially hot or the next following catalyzer layer, by increasing and the number and/or the kind of cooling tubes 7. FIG. 2 also shows that the measurements of these cooling tubes 7 have been adapted to an eventually increasing enlargement of the individual catalyzer spaces, being determined by the distance of the individual baffle 6 from each other.

In FIGS. 1 and 2 it is also disclosed how one can comply with the principle to proceed with a relatively low initial catalyzer layer with maximum temperature, by charging the preheated fresh gas with its optimum temperature obtained so far on the initial catalyzer layer which has not been cooled.

The described device also permits the use of a synthesis furnace in horizontal position, whereby advantageously the wall which is formed by cooling tubes 7 has to be arranged horizontally.

The passage of gas, which can be derived clearly from

Figure 3:
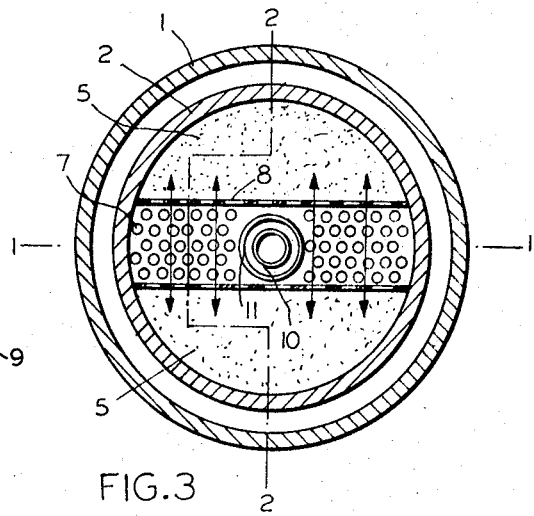
FIG. 3 is a transverse cross-sectional view of the device.

FIGS. 1 and 2, leads from a gas inlet 3 through the annular gap between the pressure body 1 and the guide tube 2 into the space between the tubes of heat exchanger 9 in the lower portion of the furnace, where the gas is preheated. Then the gas passes through central gas feeding tube 10 upward to the burner, which, as is well known, is required only for starting the furnace, and then downwardly through central coaxial outer tube 11. The gas then enters and flows upwardly through cooling tubes 7. At the upper end of the furnace, the gas is deflected and enters the uppermost catalyst fill, as indicated clearly in FIG. 1. The gas then passes downwardly and traversely through the catalyst fill, first from the right to the left and then, a stage lower, from the left to the right. With each traverse passage, the gas flows through the space between the cooling tubes 7 arranged in the center of the catalyst fill. This passage of gas is seen clearly in FIGS. 2 and 3. At the end of the catalyst fill, the gas enters the tubes of main heat exchanger 9, yields its heat to the fresh gas flowing around the exterior of the said tubes, and is discharged at 4 from the furnace.

I claim:
1. Device for accomplishing exothermic catalytic gas reactions, more especially of the synthesis of ammonia from nitrogen and hydrogen, wherein internal reactor temperature is regulated by the gradual indirect cooling of the hot reaction gases during flow through the catalyzer and by heat exchange with a fresh synthesis gas mixture, which comprises a furnace body having a gas inlet at the top thereof and a gas outlet at the base thereof, a guide tube placed coaxially within said furnace body, a first heat exchanger mounted within said guide tube at the base thereof, the upper part of said guide tube above said first heat exchanger being filled with said catalyzer, a second heat exchanger comprising a continuous cooling tube system extending across the diameter of and substantially through the height of said catalyzer, permeable walls on both sides of said continuous cooling tube system for separating said continuous cooling tube system from said catalyzer, spaced baffle plates horizontally arranged within said catalyzer and forming alternating passages between the walls of said guide tube through said catalyzer and the spaces between the tubes of said continuous cooling tube system, a central gas feeding line into which the furnace burner extends from the top of said device, and a gas return pipe positioned coaxially on the exterior of said central gas feeding line, both said central gas feeding line and said gas return pipe centrally positioned within said device and surrounded by the tubes of said continuous cooling tube system, whereby said gas flow is through said inlet, the space between the tubes of said first heat exchanger, said central gas feeding line, said gas return pipe, the tubes of said continuous cooling tube system, said alternating passages, the tubes of said first heat exchanger and said outlet.

2. Device according to claim 1 wherein said continuous cooling tube system comprises individual sections of cooling tubes, each of said sections including a different number of tubes.

3. Device as claimed in claim 1 wherein said continuous cooling tube system extends up to one of said baffle plates which is second from the top of said furnace body.

4. Device as claimed in claim 1 wherein said continuous cooling tube system extends up to, but not into, the uppermost of said alternating passages.

5. Device as claimed in claim 1 wherein said walls are apertured sheets.

6. Device as claimed in claim 1 wherein said continuous cooling tube system consisting of constructive units having the height of the corresponding alternating passage of said catalyzer fill.

7. Device as claimed in claim 1 wherein said continuous cooling tube system consists of constructive units having the height of the distance of said baffle plates from each other.

References Cited

UNITED STATES PATENTS

| 3,254,967 | 6/1966 | Wentworth | 23—288 |
| 3,440,021 | 4/1969 | Niedetzky et al. | 23—289 |
| 3,472,631 | 10/1969 | Schober | 23—289 |

FOREIGN PATENTS

| 641,000 | 4/1964 | Belgium | 23—199 |
| 1,142,586 | 1/1963 | Germany | 23—289 |

JAMES H. TAYMAN, JR., Primary Examiner

U.S. Cl. X.R.

23—288, 199, 1